INVENTORS.
Quentin Berg.
Richard W. Black.
BY
Balluff and McKinley
ATTORNEYS

United States Patent Office 3,276,098
Patented Oct. 4, 1966

3,276,098
ELECTRIC TERMINAL APPLICATOR
Quentin Berg, New Cumberland, and Richard W. Black, York, Pa.; said Black assignor to Berg Electronics, Inc., New Cumberland, Pa., a corporation of Pennsylvania
Filed June 16, 1964, Ser. No. 375,510
6 Claims. (Cl. 29—33)

This invention relates to electric terminal applicators and has particular reference to a novel and improved apparatus for stripping the end of an insulated electrical conductor and applying an electrical terminal thereto.

Conventional apparatus of this type is not entirely satisfactory because it is cumbersome, inflexible, and relatively slow. The present invention provides an efficient, compact, flexible apparatus which is more useful and adaptable. Furthermore, in the new and improved machine of our invention the stripping and crimping apparatus, although coordinated and synchronized, are separated, making it possible to better control the quality and dependability of each of such operations and to change one independently of the other.

A principal object of the invention, therefore, is to provide a more efficient and useful apparatus for stripping the end of an insulated electrical conductor and applying an open-sided crimp type of ferrule to the end of such conductor.

Other and further objects of the invention will be apparent from the following description and claims and may be understood by reference to the accompanying drawings, of which there are nine sheets, which by way of illustration show a preferred embodiment of the invention and what we now consider to be the best mode of applying the principles thereof. Other embodiments of the invention may be used without departing from the scope of the present invention as set forth in the appended claims.

In the drawings:

FIG. 2 is an enlarged fragmentary front elevational view of part of the apparatus illustrated in FIG. 1;

FIG. 3 is a plan view of the lower part of the apparatus, illustrating the feed and stripping mechanism;

FIG. 7 is an enlarged view similar to FIG. 2 but illustrating the apparatus during the crimping operation before the dies have bottomed;

FIG. 8 is an enlarged sectional view taken along the line 8—8 of FIG. 7;

FIG. 11 is a fragmentary front elevational view of the crimping dies and the associated transfer mechanism at the bottom of the crimping stroke;

FIG. 16 is an exploded view of the cutter dies;

The insulation stripping and ferrule crimping apparatus illustrated is adapted to apply strip terminals 20 (FIG. 4) to the bared end of an electrical conductor by crimping the ferrule 22 thereof over the bared end of the wire after the insulation has been stripped therefrom, by crimping the ferrule 24 of such terminal over the insulation adjacent the bared end of the wire and by severing the terminal 20 from its carrier strip 26. The terminals 20 extend in parallel relation from the strip 26. The terminal 20 may be an electrical connector of the disconnect type wherein the end 28 comprises a socket or receptacle for receiving a spade type terminal.

Figures 1, 15:
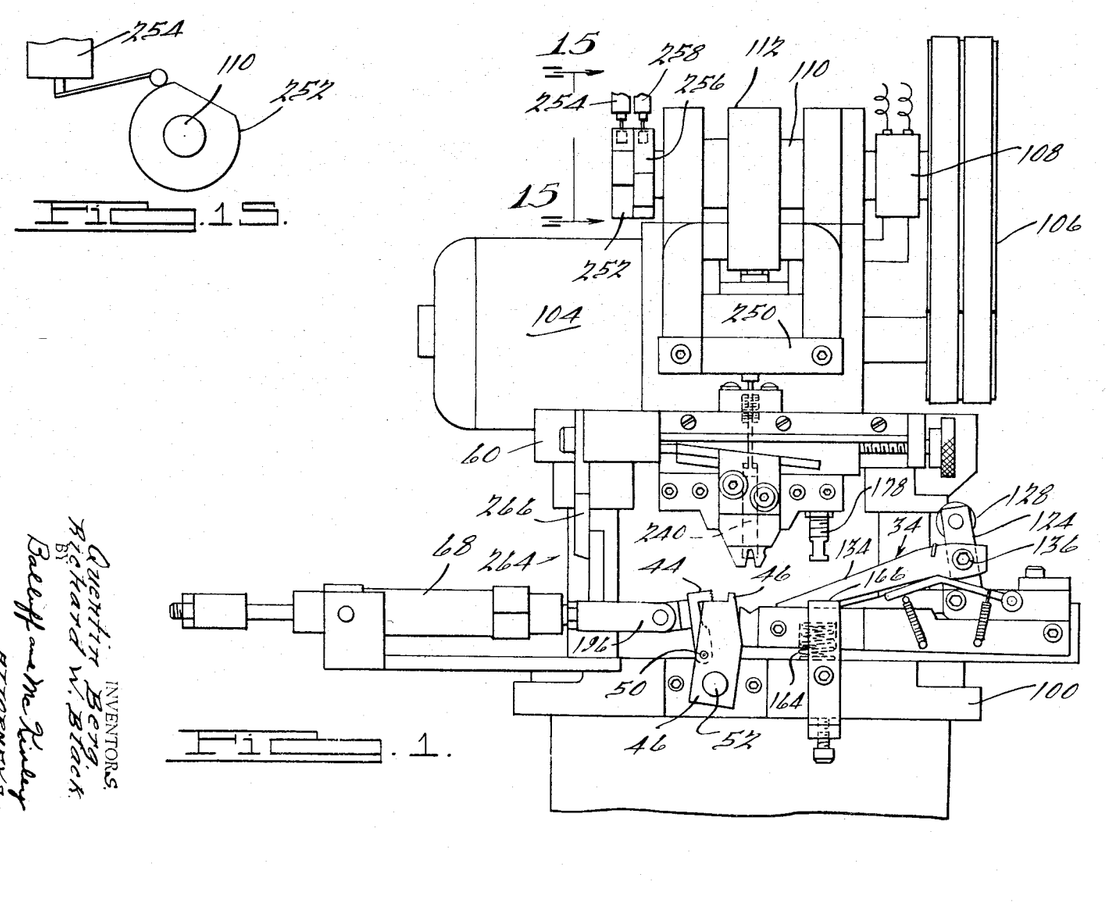
FIG. 1 is a front elevational view of a press type of apparatus embodying the invention, with certain parts omitted.
FIG. 15 is a somewhat schematic view of one of the cam-operated microswitches which are controlled by a cam on the crankshaft of the press, taken along the line 15—15 of FIG. 1.
Figure 1B:
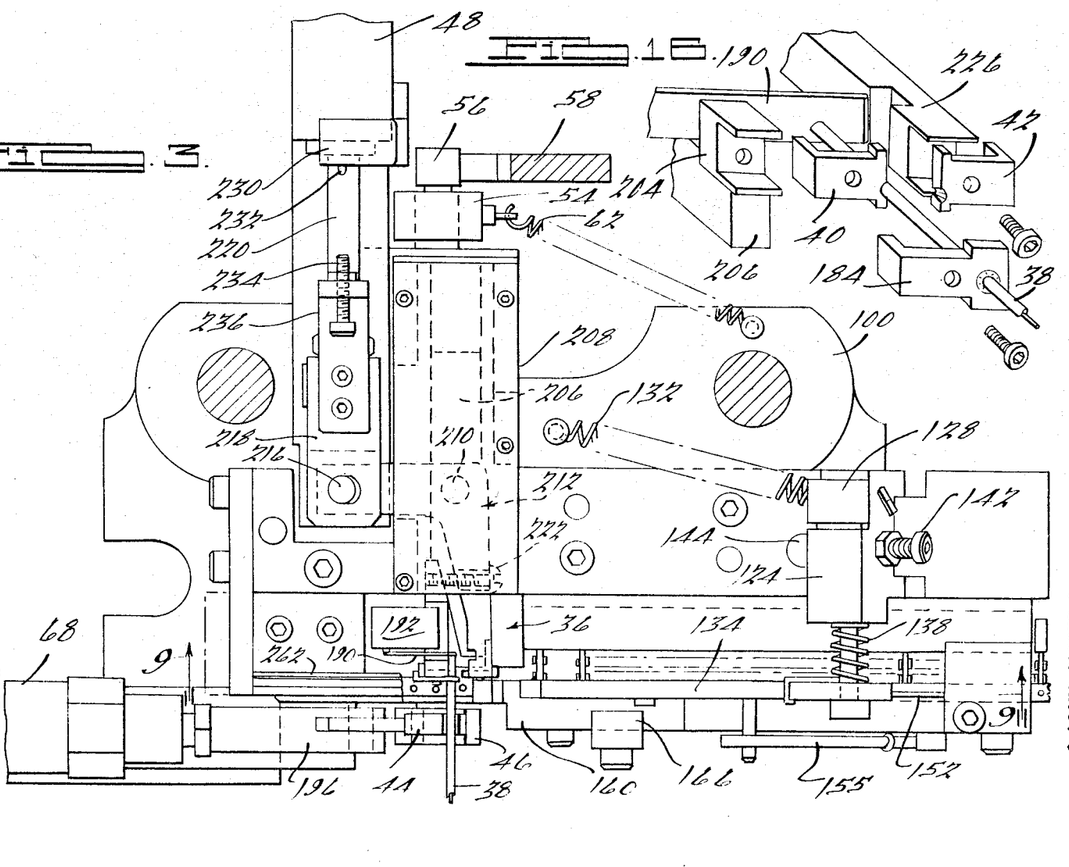
Figure 4:
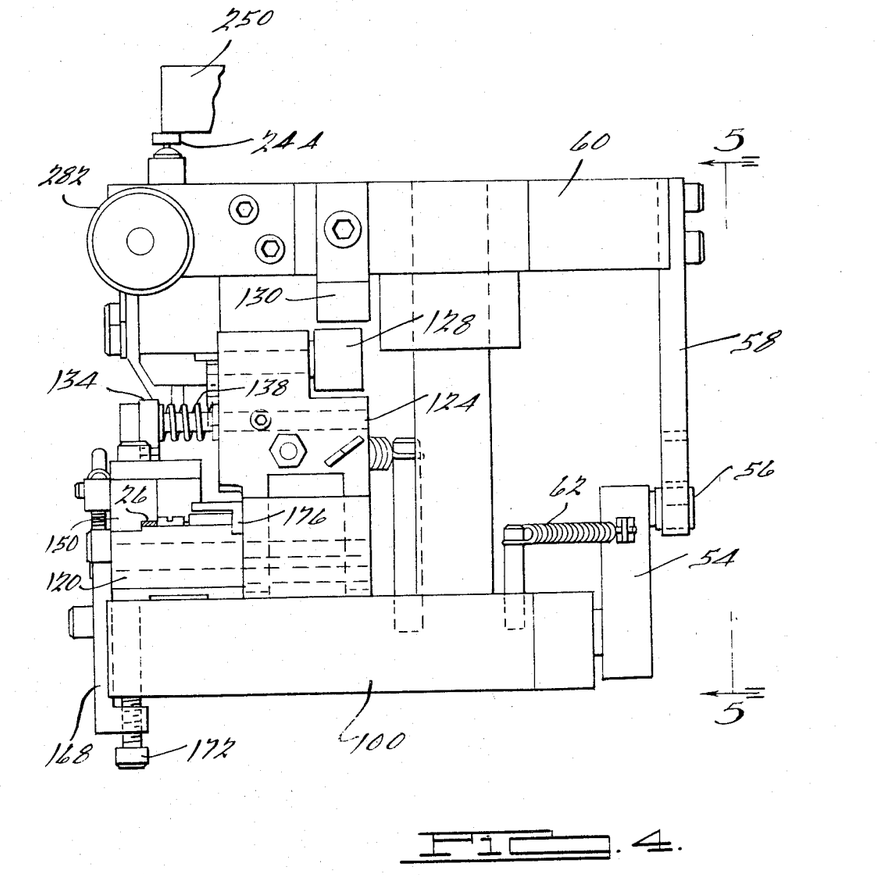
FIG. 4 is a side elevational view of the apparatus illustrated in FIG. 2, looking in the direction of the arrow at the right-hand side of FIG. 2.
Figures 6, 14:
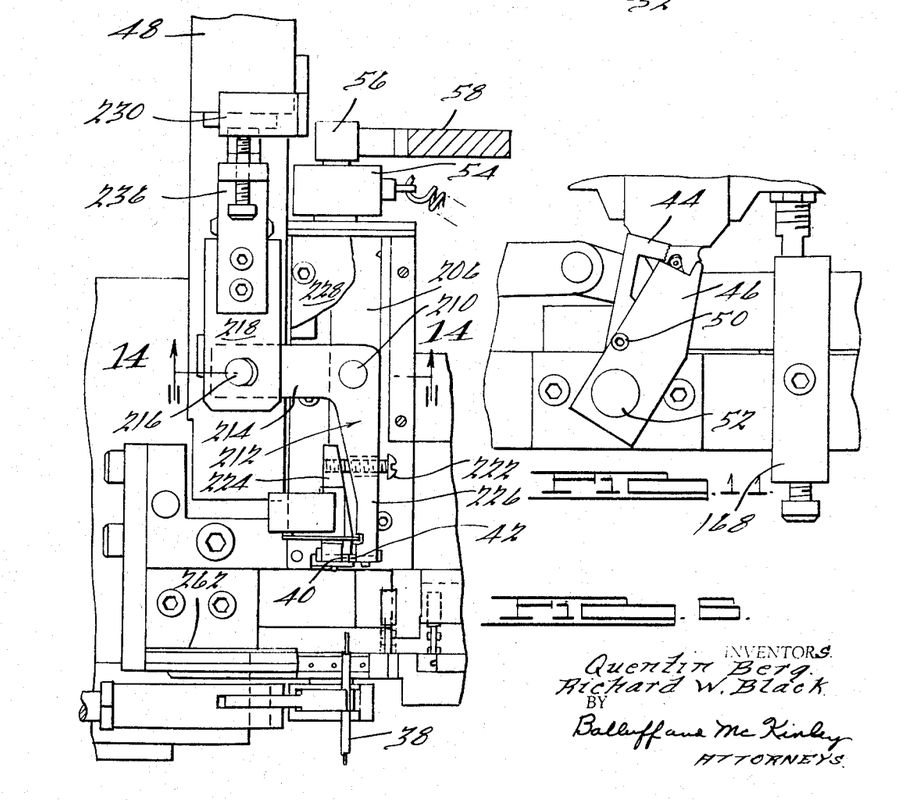
FIG. 6 is a fragmentary plan view of the stripping mechanism, similar to FIG. 3, but showing the stripping mechanism at the end of the work stroke.
FIG. 14 is a fragmentary sectional view taken along the line 14—14 of FIG. 6.

As illustrated in the drawings, and referring more particularly now to FIGS. 1, 2 and 3, the apparatus comprises in general opposed crimping dies 30 and 32 operable by closing to crimp the crimping ferrule or ferrules of a terminal 20 disposed therebetween onto the end of a conductor, feed mechanism indicated generally at 34 operable to position the lead terminal of a series of strip-connected terminals (as illustrated in FIG. 4) between the dies 30 and 32 when the same are open, stripper mechanism 36 operable for stripping insulation from the lead end of a conductor 38, said stripper mechanism comprising reciprocating stripper jaws and cutters 40 and 42, clamping jaws 44 and 46 operable for gripping the insulated conductor 38 so as to position the lead end thereof between the stripper jaws and cutters 40 and 42, and means including a double acting air cylinder 48 for actuating and moving the stripper jaws 40 and 42 so as to remove the severed insulation from the conductor 38 by moving the severed insulation axially of the conductor so as to expose the bared end of the conductor, the clamping jaws 44 and 46 forming a transfer device operable for laterally moving or shifting the stripped conductor 38 from its stripping position as illustrated in FIGS. 3 and 6 to a position wherein the end of the conductor is in line with the open side of the ferrule of the lead terminal and between the ferrules thereof and the crimping dies 30 and 32. As illustrated, the apparatus is adapted to crimp the wire and the insulation ferrules 22 and 24. Reference characters 30 and 32 refer generally to the dies for both ferrules. However, the insulation crimping ferrule 24 is not always used in which case the dies 30 and 32 would be modified accordingly to crimp only the wire crimping ferrule 22.

Figure 5:
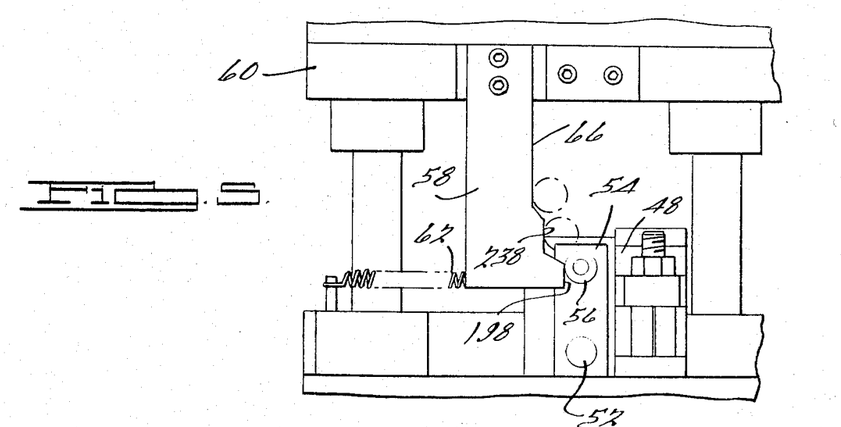
FIG. 5 is a rear elevational view, with parts omitted, and looking in the direction of the arrows 5—5 in FIG. 4.
Figure 10:
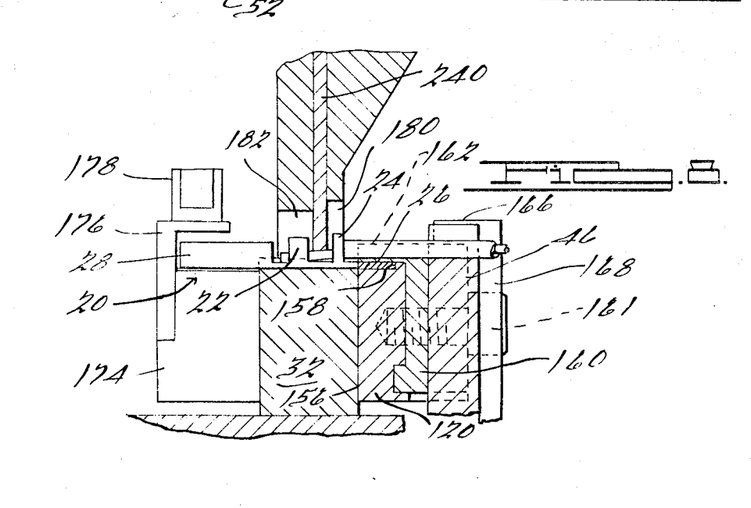
FIG. 10 is an enlarged view similar to FIG. 8 and taken along the line 10—10 of FIG. 9.
Figure 12:
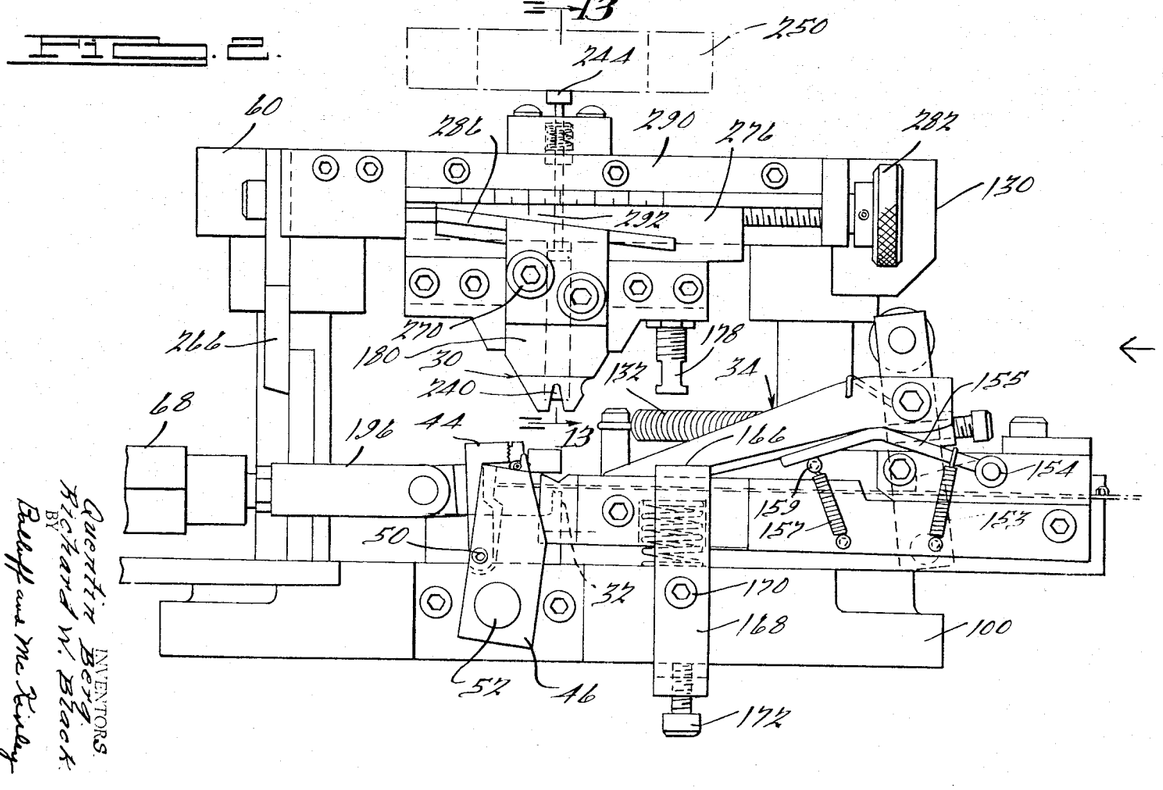
FIG. 12 is a plan view of a strip of terminals applied by the apparatus illustrated.

The clamping jaw 44 is pivoted at 50 to the jaw 46 and this in turn is fixed to a rock shaft 52 which at the back of the apparatus (FIG. 5) carries a control arm 54 having a roller 56 which functions as a cam follower with respect to the stepped cam 58 carried by and movable with the shoe 60 of the press. A spring 62 biases the roller 56 against the stepped surface of the cam 58. As the press closes the dies 30 and 32, the jaws 44 and 46 are shifted clockwise (FIG. 1) so as to position the end of the conductor 38 clamped between the jaws 44 and 46 in line with the open side of the ferrule of the lead terminal, which is bottomed on the upper end of the die or anvil 32, before the crimping die 30 bottoms. As the crimping dies close, the lead terminal is sheared from its carrier strip 26 by the shearing dies indicated generally at 64 (FIG. 10). The crimping dies 30 and 32 may be of any conventional type, such for example as those illustrated in Berg U.S. Letters Patent No. 2,854,648, issued September 30, 1958. The crimping dies 30 and 32 are constructed so that upon closing they will crimp the upstanding prongs of the open-sided ferrules around and to a conductor which is seated in the ferrules so as to affix the terminal of which the ferrule forms a part to the conductor.

As the crimping die 30 bottoms, the stepped cam 58 moves downwardly to a position where the cam follower 56 will engage the cam surface 66, and this will permit the jaw 46 under the influence of spring 62 to move further in a clockwise direction and away from jaw 44, and in effect open the jaws 44 and 46 and thereby release the conductor 38 clamped therebetween, permitting the ferrules which have just been crimped to the end of the conductor to remain in the crimping die 30 as it rises. After the conductor 38 is lifted out from between the jaws 44 and 46 by the upward motion o fthe crimping die 30, a double acting air cylinder 68 which is connected to the jaws 44 and 46 in cooperation with the cam 58 and the cam follower 56 retracts the jaws 44 and 46 to what may be termed their stripping position, i.e., in line with the stripper jaws 40 and 42. Also, as the crimping die 30 opens, the feed mechanism is actuated to position the succeeding lead terminal on the upper end of the anvil 32 in position for the next cycle of operation.

The apparatus in general comprises a reciprocating press which includes a base 100 upon which are mounted the anvil 32, the feed mechanism 34, and the stripper mechanism 36, the feed mechanism 34 being arranged at the front and to one side of the anvil 32 while the stripper mechanism is arranged at the other side thereof. The movable crimping die 30 is mounted on the shoe 60 of the press so as to move therewith, and the shoe is cycled by an electric motor 104 through a belt and pulley drive 106, a one-revolution clutch 108, a crankshaft 110, and a crank 112 which is suitably connected to the shoe 60 for effecting the reciprocation thereof.

Figure 9:
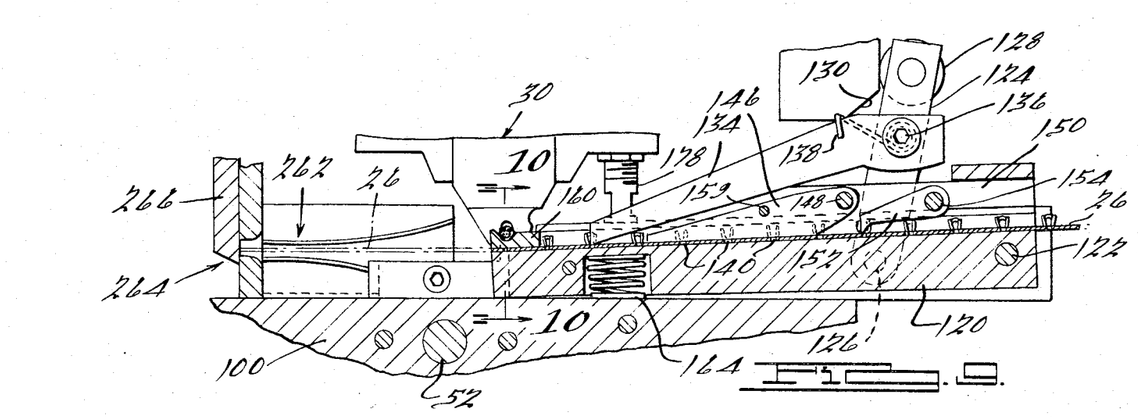
FIG. 9 is a sectional view taken along the line 9—9 of FIG. 3, and showing the feed mechanism and the crimping dies at the bottom of the crimping stroke.

The feed mechanism 34 includes, as illustrated in FIGS. 2, 9 and 10, a guide bar 120 pivoted on a shaft 122 supported by an extension of the base 100, an arm 124 pivoted at 126 to the extension of the base 100, a roller 128 carried by the arm 124 and cooperable with a reciprocating cam 130 which is mounted on and movable with the shoe of the press, and a spring 132 which reacts on the arm 124 so as to bias the same in a counterclockwise direction about its pivot point 126.

A reciprocating feed finger 134 is pivoted by the pin 136 to the arm 124, and a spring 138 reacts on the feed finger 134 so as to bias the free end thereof toward the upper surface of the guide bar 120. As the ram of the press descends, the cam 130 cooperates with the roller 128 to pivot the arm 124 to the right (FIG. 9) so as to retract the feed finger 134, the forward end of which is shaped to engage the holes 140 in the carrier strip 26 so that when the press ram opens and the cam 130 moves out of the path of the roller 128, the spring 132 will be effective for moving the feed finger 134 so as to move the next succeeding terminal on the carrier strip 26 into position on the anvil 32.

The end of a threaded bolt 142 carried by the arm 124 cooperates with a pin 144 which forms a stop to limit the feed stroke of the feed finger 134. The bolt 142 is adjustable. A drag bar 146 pivoted at 148 to a cover plate 150 carried by the guide bar 120 rides on the carrier strip 26 so as to hold the same against the upper surface of the guide bar 120, and a pawl 152 pivoted at 154 to the cover plate 150 is also engageable with the holes 140 in the carrier strip 26 so as to prevent undesired movement thereof when the feed finger 134 is disengaged from the carrier 26. An arm 155 (FIG. 7) fast on the shaft 154 is biased by spring 153 to bias the pawl 152 against the carrier strip 26, the end of the arm 155 reacting on a cross pin 159 carried by the drag 146 to bias it against the carrier strip 26. Spring 157 also reacts on cross pin 159 to bias the drag 146 against the carrier strip.

As shown in FIGS. 8 and 10, a face 156 of the guide bar 120 abuts the front face of the anvil 32 and the guide bar is provided with a shoulder 158 which serves to locate one edge of the strip 26. A hold-down plate 160 is bolted by bolt 161 and secured to the front face of the guide bar 120 and includes an overhanging portion 162 which cooperates with a spaced horizontal surface of the guide bar 120 to provide a slot for accommodating the carrier strip 26. From FIG. 8 it will be evident that the ferrules 24 and 22 overlie the anvil 32, and the portion 28 of the terminal overhangs the left-hand side of the anvil 32. The lower edge of the overhanging portion 162 and the upper right edge of the anvil 32 form shearing dies 64 which cooperate to shear the carrier strip 26 from the terminal 20 when the guide bar 120 and the hold-down plate 160 secured thereto move downwardly relative to the anvil from the position illustrated in FIG. 8 to that illustrated in FIG. 10. This occurs as the die 30 approaches the bottom of its stroke.

A coil spring 164 reacting on the guide bar 120 biases the latter upwardly against the upper arm 166 of a clamp 168 which provides a stop to limit the upward movement of the guide bar 120. The clamp 168 is bolted at 170 to the base of the press. A bolt 172 threaded to the lower arm of the clamp 168 reacts against the under side of the base 100 so as to provide a vertical adjustment for the clamp 168 when the bolt 170 is loosened. A part 174 of the guide bar 120 is provided with a cover 176 which overlies the path of the portions 28 of the terminals 20 and this cover is positioned so as to be engaged by a pin 178 which is adjustably mounted on the shoe of the press so that as the crimping die 30 bottoms, the end of the pin 178 will engage the cover 176 and move the guide bar 120 downwardly so as to shear the carrier strip 26 from the lead terminal 20. As this occurs, the crimping die crimps the upstanding prongs of the ferrules 22 and 24 around the end of the conductor 38 and holds the lead terminal securely against the anvil 32 as shown in FIG. 8. As there shown, the crimping die 30 includes a crimping die 180 for the insulation ferrule 24 and a crimping die 182 for the wire crimping ferrule 22.

With the press open and the parts arranged as illustrated in FIGS. 1, 2, 3 and 16, a normally open foot switch 107 is closed and the lead end of a conductor 38 is then inserted between the jaws 44 and 46 and through an opening in a guide 184 and between the cutters 40 and 42 and up against an actuating arm 190 of a normally open microswitch 192. Switch 192 controls one of the solenoids 193 of a double solenoid operated 4-way air valve 194 which controls the energization of the double acting air cylinder 68 so as to energize such cylinder 68 to cause the piston thereof to shift the clevis 196 connected thereto and to the jaw 44 to move the latter clockwise and against the other jaw 46 so as to clamp the conductor 38 therebetween. At this time jaw 46 is held by rock shaft 52 and arm 54 and roller 56 reacting against the surface 198 on the cam 58.

The jaws 44 and 46 provide a wide mouth in their open position so as to readily accommodate a conductor with insulation of different thicknesses for a given wire size. Tripping of the microswitch 192 sets valve 194 to deliver air under pressure to one side of the air cylinder 68 so as to energize the same, and the valve 194 is such that the air pressure line to the cylinder 68 is maintained open so that the piston of cylinder 68 will bias the jaw 44 toward its closed position and subsequently shift the jaws 44 and 46 from the position as illustrated in FIGS. 1, 2 and 3 to that illustrated in FIG. 7. However, the shifting of the clamping jaws 44 and 46 from the position illustrated in FIG. 1 to that illustrated in FIG. 7 does not occur until after the stripping operation is completed and the press ram is closing. The build-up of pressure in the air cylinder 68 actuates a normally open, pressure responsive switch 200 which controls the circuit through a solenoid 201 of a double solenoid operated 4-way valve 202, which in turn controls the supply of air under pressure to one end of the double acting power cylinder 48. The power cylinder 48 forms a means for actuating the stripper mechanism after the jaws 44 and 46 clamp the conductor 38 in position.

The stripper jaw and cutter 40 is bolted to a bracket 204 which is fixed to the slide 206. The slide 206 is reciprocably mounted in a guide 208 mounted on the base of the press and is shown in its retracted position in FIG. 3 and in its position at the end of the work stroke in FIG. 6. The slide 206 carries a pivot pin 210 on which a bell crank 212 is pivoted. One arm 214 of the bell crank has a pin and slot connection with a clevis 218 which is affixed to the piston rod 220 of the power cylinder 48.

A screw 222 mounted in an upwardly projecting part 224 of the slide 206 and projecting through a hole in the arm 226 of the bell crank serves to limit the extent of counterclockwise movement of the bell crank about the pivot 210 so that when the piston of the air cylinder 48 moves toward the front of the press (FIG. 6), the screw 222 will limit the counterclockwise movement of the bell crank 212 and cause the slide 206 to move from the position illustrated in FIG. 6 to that illustrated in FIG. 3. However, when the conductor 38 is inserted through the guide 184 and between the jaws 40 and 42 and against the switch actuated arm 190, the parts are arranged as illustrated in FIG. 3 and, as previously explained, this first closes jaws 44 and 46 and then energizes the air cylinder 48 so as to effect the working stroke of the stripper by moving the slide 206 and associated parts to the position as shown in FIG. 6.

The jaw and cutter 42 of the stripper is mounted on the end of the arm 226 of the bell crank 212 so that the pull of the piston on bell crank 212 through the pin and slot connection 216 will close the jaws and cutters 40 and 42 by moving the movable jaw and cutter 42 against the cutter and jaw 40. The jaws 40 and 42 are provided with cutting edges at their rear faces and with conical recesses ahead of such cutting edges so that when the jaws 40 and 42 are closed, the cutting edges will sever the insulation on the conductor 38 without severing the wire of the conductor, the cutting edges defining a circular opening which will clear the wire of the conductor.

The energization of the cylinder 48 will thus first close the jaws and cutters 40 and 42 and then move the same rearwardly to effect the working stroke thereof and strip the severed insulation from the conductor by moving such severed piece of insulation axially of the conductor. The bell crank 212 and the slide 206 are covered by a plate 228 so as to exclude severed pieces of insulation from interfering with movement of the slide 206. In addition, a jet of compressed air may be discharged immediately rearwardly of the cutters 40 and 42 so as to carry away the piece of insulation which has been stripped from the conductor 38.

As the slide reaches the end of its work stroke, a normally open microswitch 230 is closed and this energizes a solenoid 109 which engages the clutch 108 of the press so as to initiate the closing movement of the ram, assuming the switch 231 which controls the motor circuit is closed. The actuating button 232 of the switch 230 is engaged by the end of a bolt 234 carried by a bracket 236 and supported on the clevis 218 as the slide 206 reaches the end of its working stroke.

Figures 13, 14:
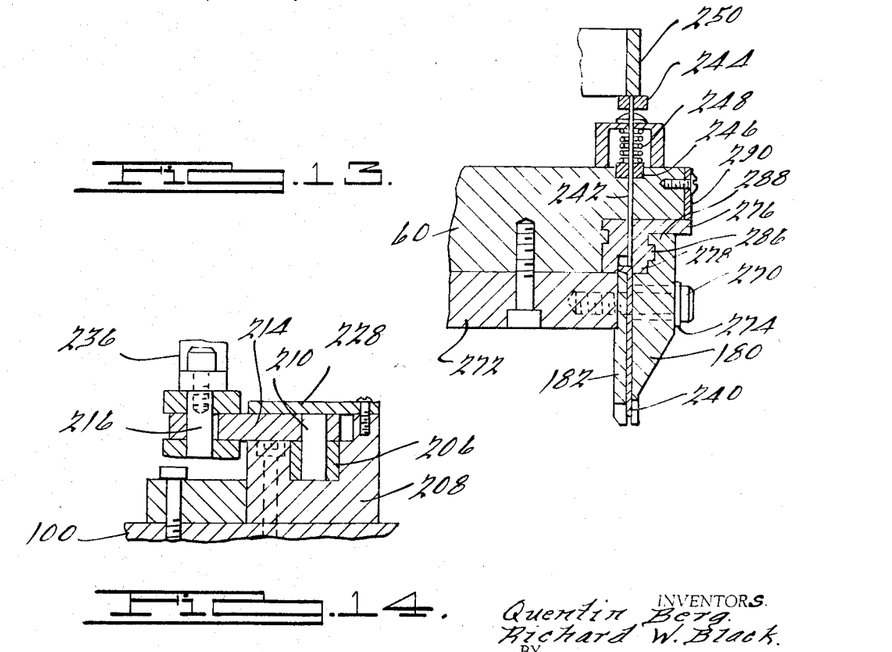
FIG. 13 is a sectional view taken along the line 13—13 of FIG. 2 and illustrating the mechanism for ejecting the crimped terminals from the movable crimping die.
Figure 17:
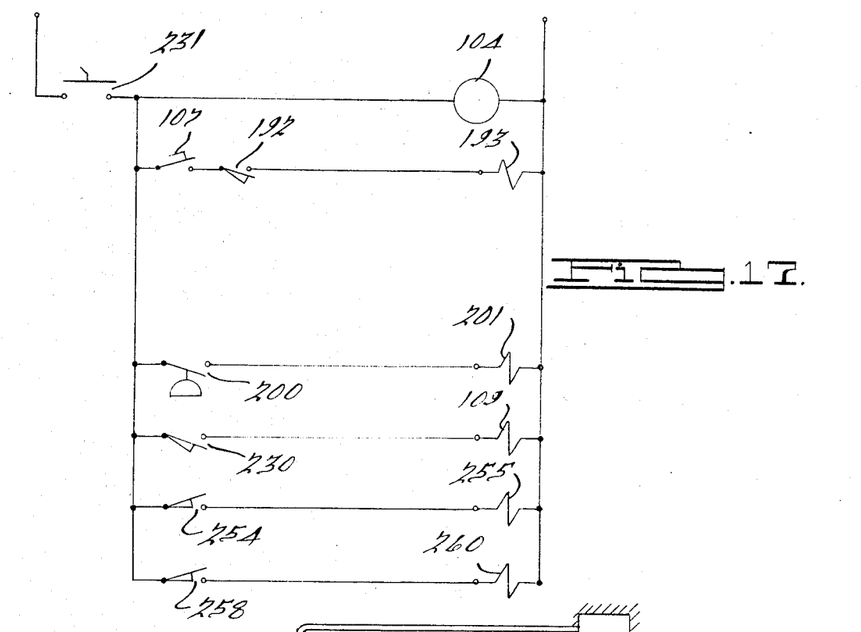
FIG. 17 is a schematic circuit diagram.
Figure 18:
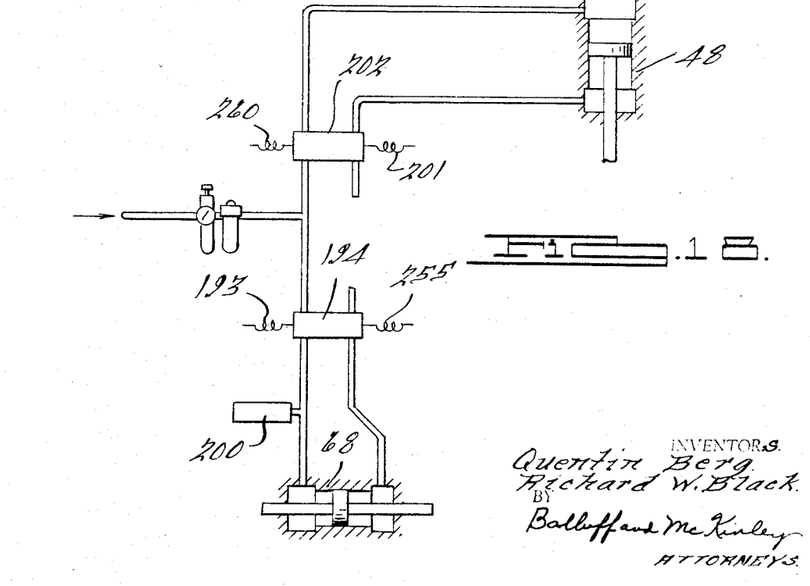
FIG. 18 is a schematic diagram of the pneumatic system which operates the stripper and the transfer mechanism.

The air pressure is maintained in the air cylinder 68 so that as the press ram closes, the stepped cam 58 will permit the roller 56 to move from the cam surface 198 onto the cam surface 238, and this will permit the air cylinder 68 to shift the clamping jaws 44 and 46 from the position illustrated in FIG. 1 to that illustrated in FIG. 7 so as to position the end of the conductor 38 between the dies 30 and 32 and in line with the open sides of the ferrules 22 and 24 on the anvil 32. The press ram then continues to close to effect the crimping and severing operations as previously described, and also the retraction of the feed finger 134. As previously noted, the crimping die 30 as illustrated includes the crimping die 180 for the insulation ferrule 24 and a crimping die 182 for the wire crimping ferrule 22. A blade 240 is carried by the crimping die 30, is disposed between the crimping dies 180 and 182, and is slidable relative thereto. A pin 242 reacts against the upper end of the blade 240 and at its upper end is provided with a collar 244. A second collar 246 affixed to the pin 242 is biased by a coil spring 248 so as to normally position the pin 242 and the blade 240 as illustrated in FIGS. 1, 8 and 13. As the crimping die 30 is moved to its closed position, the blade 240 will engage the bared end of the conductor between the ferrules 22 and 24, as illustrated in FIG. 8, so as to seat the conductor against the bottom of the ferrules and the ferrules against the anvil 32 before the crimping dies 180 and 182 bottom so as to properly locate the end of the conductor with respect to the ferrules 22 and 24 for the crimping operation.

The spring 248 will permit the blade 240 to yield as the crimping dies 180 and 182 bottom. The crimping dies 180 and 182 are designed so that as they move upwardly away from the anvil 32, the crimped ferrules 22 and 24 will remain therein, the spring 248 not being of sufficient strength to actuate the blade 240 to eject the ferrules from the dies. However, as the ram reaches the upper part of its stroke, the collar 244 will engage a stop or abutment 250 on the press which will cause the pin 242 to shift the blade 240 so as to eject the crimped terminal from the crimping dies as the press approaches the end of its upward stroke. As the gripping jaws 44 and 46 open when the press ram begins to open, the operator will be free to remove the conductor with the terminal crimped thereon from the press. At the same time, upward opening movement of the press ram will permit the feeding mechanism to advance the next terminal 20 into position on the anvil 32 for the next cycle of operation. As the press opens, the cam 252 on the crankshaft will close the normally open microswitch 254 so as to energize solenoid 255 to position valve 194 to port one side of the double acting cylinder 68 to atmosphere and supply air under pressure to the other side thereof so as to bias the clamping jaw 44 to the left, looking at FIG. 1. At the same time the stepped cam 58 cooperating with the roller 56 will turn the rock shaft 52 so as to shift the jaw 46 back to its position in line with the stripper mechanism, as illustrated in FIG. 1.

Following the energization of the double acting cylinder to retract the clamping jaws 44 and 46, the pressure actuated switch 200 will open and thereafter a cam 256 on the crankshaft will close the normally open microswitch 258 so as to energize solenoid 260 to position valve 202 so as to port one side of the double acting cylinder 48 to atmosphere and to supply air under pressure to the other side thereof so as to retract the slide 206 and return the stripper mechanism to its starting position. In so doing the action of the bell crank 212 will open the cutter jaws 40 and 42.

The carrier strip 26, after the terminals are severed therefrom, is fed through a guide 262 to a cutting mechanism 264 which serves to cut the strip into lengths, the cutting mechanism including a shear blade 266 which is mounted on the ram of the press so as to reciprocate therewith.

The crimping dies 180 and 182 are secured by bolts 270 to a block 272 which is bolted to a shoe 60 mounted on the ram of the press, spring washers 274 being interposed between the heads of the bolts 270 and the die 180 so as to permit the vertical adjustment of the latter. The dies 180 and 182 are backed up and vertically located by the transversely movable adjustment plate 276 which is carried by the shoe 60. The upper end of the crimping die 180 is provided with a central notch so as to accommodate the head 278 of the blade 240. The adjustment plate 276 is keyed to the shoe 60 and is shiftable or adjustable transversely by the threaded bolt 280 carrying a knurled head 282. The bolt 280 is threaded into a tapped opening in the plate 276, and the shank of the bolt between the threaded portion and the head 282 is rotatable in a fixed guide 284 so that upon rotation of the knurled head 282, the adjustment plate 276 will be moved in one direction or the other.

The adjustment plate is provided with a sloping key or guide 286 which cooperates with a similarly oriented key or guide 288 on the upper end of the die 180 so that as the adjustment plate 276 is moved transversely in one direction or the other, the die 180 will be correspondingly vertically adjusted. This adjustment is to position the crimping die so as to take care of insulation of different thicknesses on the conductor 38. During this adjustment the crimping die 182 for the wire crimping ferrule 22 remains fixed vertically relative to the parts in which it is mounted.

A scale 290 is mounted on the front of the die shoe 60 just above the adjustment plate 276, and the adjustment plate 276 is provided with suitable indicia 292 so as to indicate the extent of vertical adjustment of the insulation crimping die 180 which occurs as the knurled head 282 is rotated in one direction or the other. In this way the machine can be readily and accurately adjusted so as to change the position of the insulation crimping die 180 to accommodate insulation of different thicknesses on the conductor 38 without disturbing the wire crimping die 182.

While we have illustrated and described a preferred embodiment of our invention, it is understood that this is capable of modification, and we therefore do not wish to be limited to the precise details set forth but desire to avail ourselves of such changes and alterations as fall within the purview of the following claims.

We claim:

1. Apparatus for stripping insulation from the end of an insulated electrical conductor and crimping an open-sided crimp type of ferrule on the bared end of such conductor comprising opposed crimping dies operable by closing to crimp a crimping ferrule disposed therebetween, feed mechanism operable to position the lead ferrule of a series of ferrules between said dies when open, mechanism for stripping insulation from the lead end of a conductor comprising a reciprocating stripper, clamping jaws for gripping an insulated conductor so as to position the lead end thereof in said stripper, and means for actuating and moving said stripper so as to remove the severed insulation from said conductor by moving it axially thereof so as to expose the bared end of said conductor, said clamping jaws forming a transfer device operable for laterally moving said conductor from its stripping position to a position wherein the bared end of said conductor is in line with the open side of said lead ferrule and between said ferrule and one of said crimping dies, means operable before closing of said crimping die for actuating said transfer device so as to position the bared end of said conductor in line with the open side of said ferrule, and means operable upon opening of said crimping dies to return said clamping jaws to their stripping position.

2. Apparatus according to claim 1 wherein said means for actuating said transfer device includes an air cylinder and means for energizing said air cylinder in response to the insertion of a conductor into said clamping jaws.

3. Apparatus according to claim 1 wherein said means for actuating said transfer device includes an air cylinder and means for energizing said air cylinder in response to the insertion of a conductor into said clamping jaws, and wherein said means for actuating and moving said stripper includes an air cylinder.

4. Apparatus for stripping insulation from the end of an insulated electrical conductor and crimping an open-sided crimp type of ferrule on the bared end of such conductor comprising opposed crimping dies operable by closing to crimp a crimping ferrule disposed therebetween, feed mechanism operable to position the lead ferrule of a series of strip-connected ferrules between said dies when open, mechanism for stripping insulation from the lead end of a conductor comprising a reciprocating stripper, clamping jaws for gripping an insulated conductor so as to position the lead end thereof in said stripper, and means for actuating and moving said stripper so as to remove the severed insulation from said conductor by moving it axially thereof so as to expose the bared end of said conductor, said clamping jaws forming a transfer device operable for laterally moving said conductor from its stripping position to a position wherein the bared end of said conductor is in line with the open side of said lead ferrule and between said ferrule and one of said crimping dies, means operable before closing of said crimping die for actuating said transfer device so as to position the bared end of said conductor in line with the open side of said ferrule, means for severing the crimped ferrule from its carrier strip, and means operable upon opening of said crimping dies to return said clamping jaws to their stripping position, said feed mechanism being operable to position the succeeding lead ferrule between said crimping dies.

5. Apparatus for stripping insulation from the end of an insulated electrical conductor and crimping an open-sided crimp type of ferrule on the bared end of such conductor comprising opposed crimping dies operable by closing to crimp a crimping ferrule disposed therebetween, feed mechanism operable to position a ferrule between said dies when open, mechanism for stripping insulation from the lead end of a conductor comprising a reciprocating stripper, air pressure controlled and operated clamping jaws for gripping an insulated conductor so as to position the lead end thereof in said stripper, and air pressure operated means for actuating and moving said stripper after said clamping jaws have closed so as to remove the severed insulation from said conductor by moving it axially thereof so as to expose the bared end of said conductor, said clamping jaws forming a transfer device operable for laterally moving said conductor from its stripping position to a position wherein the bared end of said conductor is in line with the open side of said ferrule and between said ferrule and one of said crimping dies, means operable for actuating said transfer device so as to position the bared end of said conductor in line with the open side of said ferrule before said crimping dies close, and means operable upon opening of said crimping dies to return said clamping jaws to their stripping position.

6. A press type apparatus for securing an electrical connector to the end of an insulated wire comprising an anvil, a crimping jaw movable with the press ram toward and around the anvil upon closing of the press, a strip feed mechanism located at one side of said anvil and actuated by the movement of the press to feed the lead terminal of a strip of terminals to a position where the wire barrel of the lead terminal is immediately over the anvil, a stripper located on the other side of the anvil with a cutter arranged to cut the insulation surrounding the conductor of a wire upon insertion therein and to move away from the wire upon cutting of the insulation so as to strip the severed insulation from the wire and to expose the end thereof, transfer means whereby the wire is held upon insertion into the stripper and is moved laterally away from the stripper and toward the anvil following stripping of the insulation from the end of the wire so as to position the exposed end of the wire immediately above the wire barrel of the lead terminal, whereby said wire and wire barrel are crimped together between the jaw and the anvil upon closing of the press.

No references cited.

RICHARD H. EANES, JR., *Primary Examiner.*